US012649472B2

(12) United States Patent
Zeng et al.

(10) Patent No.: US 12,649,472 B2
(45) Date of Patent: Jun. 9, 2026

(54) METHOD FOR CONTROLLING LANE CHANGE, ELECTRONIC DEVICE, AND STORAGE MEDIUM

(71) Applicant: SHANGHAI HORIZON INTELLIGENT AUTOMOTIVE TECHNOLOGY CO., LTD., Shanghai (CN)

(72) Inventors: Luyao Zeng, Shanghai (CN); Zhi Gao, Shanghai (CN)

(73) Assignee: SHANGHAI HORIZON INTELLIGENT AUTOMOTIVE TECHNOLOGY CO., LTD., Shanghai (CN)

( * ) Notice: Subject to any disclaimer, the term of this patent is extended or adjusted under 35 U.S.C. 154(b) by 30 days.

(21) Appl. No.: 18/712,647

(22) PCT Filed: Sep. 30, 2022

(86) PCT No.: PCT/CN2022/123369
§ 371 (c)(1),
(2) Date: May 22, 2024

(87) PCT Pub. No.: WO2023/093306
PCT Pub. Date: Jun. 1, 2023

(65) Prior Publication Data
US 2025/0018948 A1      Jan. 16, 2025

(30) Foreign Application Priority Data
Nov. 24, 2021     (CN) .......................... 202111409699.3

(51) Int. Cl.
*B60W 30/18* (2012.01)
*G06V 10/70* (2022.01)
*G06V 20/56* (2022.01)

(52) U.S. Cl.
CPC ....... *B60W 30/18163* (2013.01); *G06V 10/70* (2022.01); *G06V 20/588* (2022.01);
(Continued)

(58) Field of Classification Search
CPC ....................... B60W 30/18163; G06V 20/588
See application file for complete search history.

(56) References Cited

U.S. PATENT DOCUMENTS 12,214,803 B2     2/2025  Gotou et al.
2019/0009784 A1*  1/2019  Takeda ............ B60W 30/18154
(Continued)

FOREIGN PATENT DOCUMENTS

CN          103386975 A      11/2013
CN          109249930 A       1/2019
(Continued)

OTHER PUBLICATIONS

International Search Report for International PCT Application No. PCT/CN2022/123369, dated Dec. 30, 2022.
(Continued)

*Primary Examiner* — Long T Tran
(74) *Attorney, Agent, or Firm* — K&L Gates LLP

(57) ABSTRACT

Disclosed are a method for controlling lane change, an electronic device, and a storage medium. The method comprises: obtaining visual information of a surrounding environment; determining boundary data of free space of a current vehicle based on the visual information; determining information about a vehicle running side by side on at least one side of the current vehicle based on the boundary data of free space; determining lane change information based on the information about the vehicle running side by side; and controlling a driving status of the current vehicle based on the lane change information. The method can provide an accurate and reliable basis for a lane change control decision (Continued)

of the vehicle, so as to avoid potential safety hazards to a lane change caused by missing recognition of a vehicle running side by side, thereby improving reliability and safety of an automatic lane change function of the vehicle.

20 Claims, 6 Drawing Sheets

(52) U.S. Cl.
CPC ... *B60W 2420/403* (2013.01); *B60W 2520/10* (2013.01); *B60W 2552/53* (2020.02); *B60W 2554/80* (2020.02)

(56) References Cited

U.S. PATENT DOCUMENTS

| | | | | |
|---|---|---|---|---|
| 2019/0016338 | A1* | 1/2019 | Ishioka | B60W 30/18163 |
| 2019/0023273 | A1* | 1/2019 | Ishioka | G08G 1/167 |
| 2019/0061745 | A1* | 2/2019 | Hatano | B60W 10/20 |
| 2020/0148261 | A1 | 5/2020 | Varunjikar et al. | |
| 2020/0361489 | A1 | 11/2020 | Park et al. | |
| 2021/0245786 | A1 | 8/2021 | Ma et al. | |
| 2022/0262128 | A1* | 8/2022 | Nakamura | G08G 1/166 |
| 2022/0314968 | A1* | 10/2022 | Horita | G01S 17/931 |

FOREIGN PATENT DOCUMENTS

| | | | |
|---|---|---|---|
| CN | 110362096 | A | 10/2019 |
| CN | 110562258 | A | 12/2019 |
| CN | 110737266 | A | 1/2020 |
| CN | 110745140 | A | 2/2020 |
| CN | 110834630 | A | 2/2020 |
| CN | 111238520 | A | 6/2020 |
| CN | 112455445 | A | 3/2021 |
| CN | 113689718 | A | 11/2021 |
| CN | 113954838 | A | 1/2022 |
| JP | 6396645 | B2 | 9/2018 |
| WO | 2020249995 | A1 | 12/2020 |
| WO | 2021000800 | A1 | 1/2021 |

OTHER PUBLICATIONS

Written Opinion for International PCT Application No. PCT/CN2022/123369, dated Dec. 28, 2022 (English translation unavailable).
Extended European Search Report from the corresponding European Patent Application No. 22897391.3, mailed on Sep. 17, 2025.

\* cited by examiner

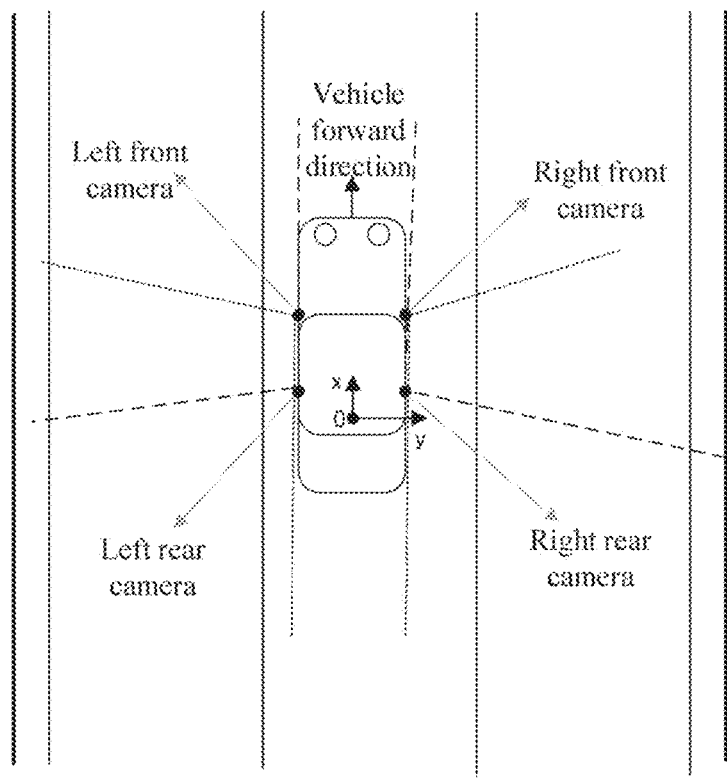

Fig. 1

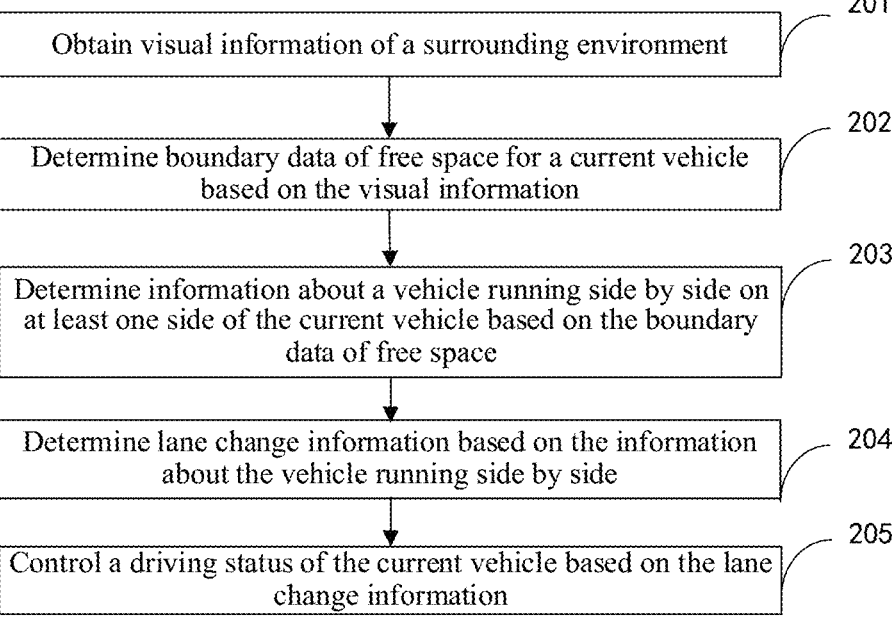

Obtain visual information of a surrounding environment — 201

Determine boundary data of free space for a current vehicle based on the visual information — 202

Determine information about a vehicle running side by side on at least one side of the current vehicle based on the boundary data of free space — 203

Determine lane change information based on the information about the vehicle running side by side — 204

Control a driving status of the current vehicle based on the lane change information — 205

Fig. 2

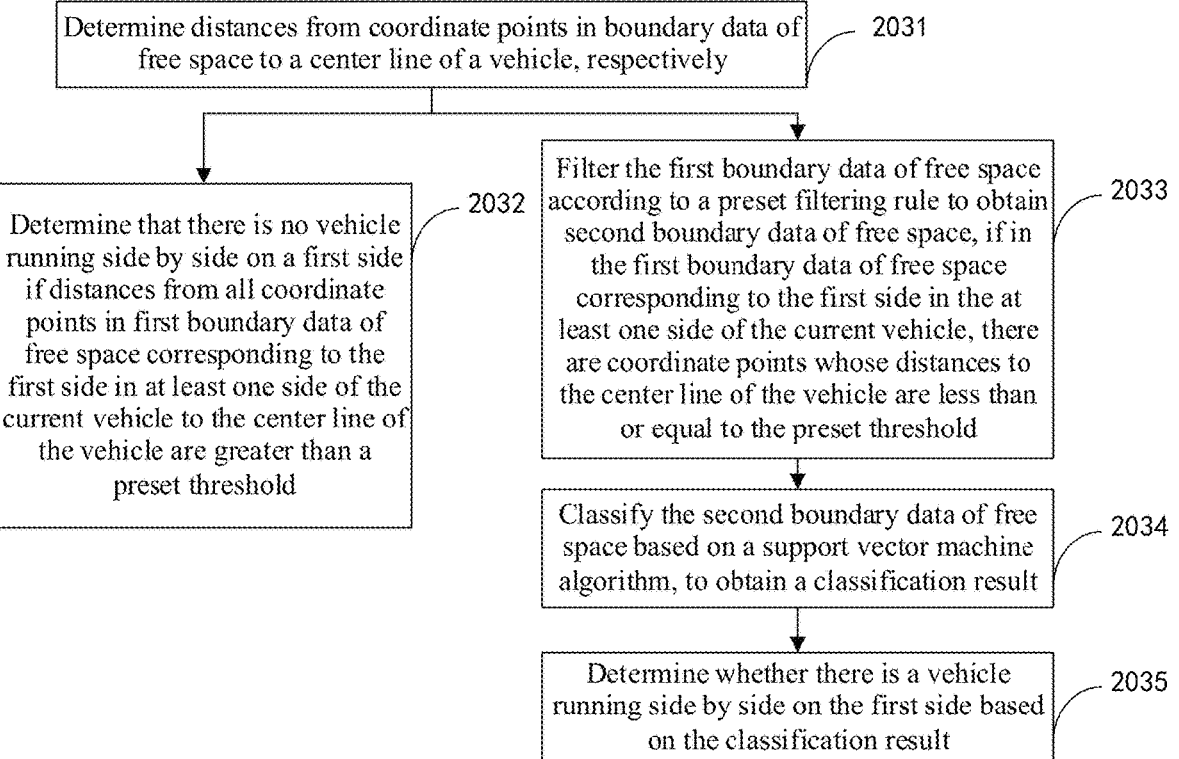

Determine distances from coordinate points in boundary data of free space to a center line of a vehicle, respectively ⟋ 2031

Determine that there is no vehicle running side by side on a first side if distances from all coordinate points in first boundary data of free space corresponding to the first side in at least one side of the current vehicle to the center line of the vehicle are greater than a preset threshold ⟋ 2032

Filter the first boundary data of free space according to a preset filtering rule to obtain second boundary data of free space, if in the first boundary data of free space corresponding to the first side in the at least one side of the current vehicle, there are coordinate points whose distances to the center line of the vehicle are less than or equal to the preset threshold ⟋ 2033

Classify the second boundary data of free space based on a support vector machine algorithm, to obtain a classification result ⟋ 2034

Determine whether there is a vehicle running side by side on the first side based on the classification result ⟋ 2035

Fig. 4

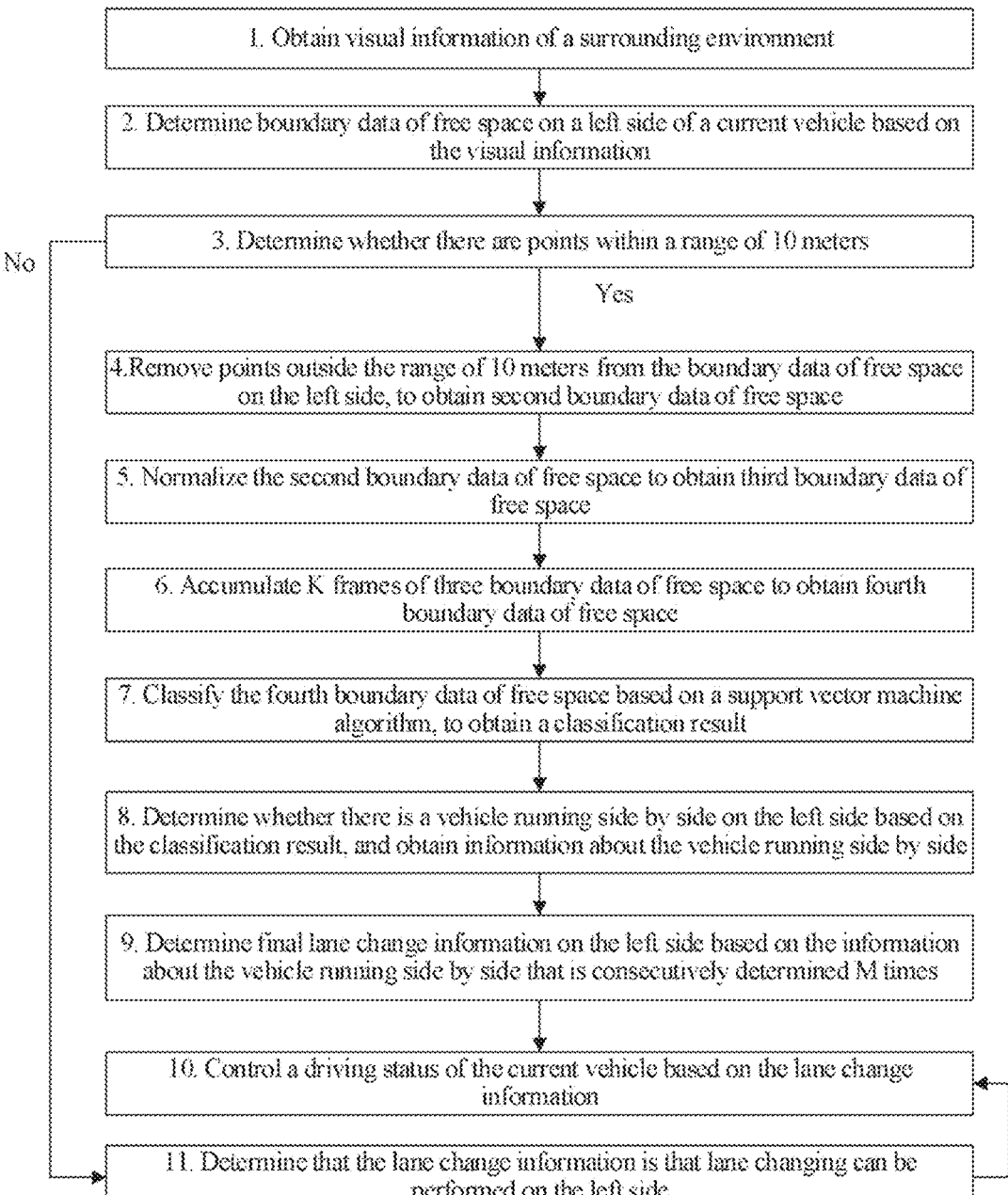

1. Obtain visual information of a surrounding environment

2. Determine boundary data of free space on a left side of a current vehicle based on the visual information 3. Determine whether there are points within a range of 10 meters No Yes 4. Remove points outside the range of 10 meters from the boundary data of free space on the left side, to obtain second boundary data of free space 5. Normalize the second boundary data of free space to obtain third boundary data of free space 6. Accumulate K frames of three boundary data of free space to obtain fourth boundary data of free space 7. Classify the fourth boundary data of free space based on a support vector machine algorithm, to obtain a classification result 8. Determine whether there is a vehicle running side by side on the left side based on the classification result, and obtain information about the vehicle running side by side 9. Determine final lane change information on the left side based on the information about the vehicle running side by side that is consecutively determined M times 10. Control a driving status of the current vehicle based on the lane change information 11. Determine that the lane change information is that lane changing can be performed on the left side

Fig. 5

METHOD FOR CONTROLLING LANE CHANGE, ELECTRONIC DEVICE, AND STORAGE MEDIUM

CROSS-REFERENCE TO RELATED APPLICATIONS

This disclosure is a U.S. National Stage Entry under 35 U.S.C. § 371 of International Patent Application No. PCT/CN2022/123369, entitled "VEHICLE LANE CHANGE CONTROL METHOD AND APPARATUS, ELECTRONIC DEVICE, AND STORAGE MEDIUM, filed Sep. 30, 2022, which claims priority to Chinese patent application No. 202111409699.3, filed on Nov. 24, 2021 and entitled "METHOD AND APPARATUS FOR CONTROLLING LANE CHANGE, ELECTRONIC DEVICE, AND STORAGE MEDIUM", the entire disclosures of which are incorporated herein by reference its their entirety.

FIELD OF THE INVENTION

This disclosure relates to computer vision technologies, and in particular, to a method and apparatus for controlling lane change, an electronic device, and a storage medium.

BACKGROUND OF THE INVENTION

At present, research on self-driving systems of self-driving vehicles is mainly focused on longitudinal control of roads, while less consideration is given to lateral movements such as lane changes. Lateral movements of vehicles are also an extremely frequent and critical part during a self-driving process. The automatic lane change function is one of the most basic functions of the self-driving vehicles. However, due to the long duration of the automatic lane change function and a large number of variable parameters involved in the scene, an error in the automatic lane change function when the vehicle is at a high speed may bring in a safety hazard.

In the prior art, whether there is a vehicle running side by side is determined based on object detection of an image. When there is a large vehicle running side by side, due to a long body and a high chassis of the large vehicle, recognition of the large vehicle running side by side may be missed. In this case, changing lanes is very dangerous. Therefore, how to effectively recognize the large vehicle running side by side to ensure reliability and safety of the automatic lane change function of the self-driving vehicle becomes a problem that urgently needs to be resolved.

SUMMARY OF THE INVENTION

To resolve the foregoing technical problem, this disclosure is proposed. Embodiments of this disclosure provide a method and apparatus for controlling lane change, an electronic device, and a storage medium.

According to an aspect of an embodiment of this disclosure, a method for controlling lane change is provided, including: obtaining visual information of a surrounding environment; determining boundary data of free space for a current vehicle based on the visual information; determining information about a vehicle running side by side on at least one side of the current vehicle based on the boundary data of free space; determining lane change information based on the information about the vehicle running side by side; and controlling a driving status of the current vehicle based on the lane change information.

According to another aspect of an embodiment of this disclosure, an apparatus for controlling lane change is provided, including: a first obtaining module, configured to obtain visual information of a surrounding environment; a first processing module, configured to determine boundary data of free space for a current vehicle based on the visual information; a second processing module, configured to determine information about a vehicle running side by side on at least one side of the current vehicle based on the boundary data of free space; a first determining module, configured to determine lane change information based on the information about the vehicle running side by side; and a control module, configured to control a driving status of the current vehicle based on the lane change information.

According to still another aspect of an embodiment of this disclosure, a computer readable storage medium is provided. The storage medium stores a computer program, and the computer program is used for implementing the method for controlling lane change described in any one of the foregoing embodiments of this disclosure.

According to yet another aspect of an embodiment of this disclosure, an electronic device is provided. The electronic device includes: a processor; and a memory configured to store processor executable instructions. The processor is configured to read the executable instructions from the memory and execute the instructions to implement the method for controlling lane change according to any one of the foregoing embodiments of this disclosure.

Based on the method and apparatus for controlling lane change, the electronic device, and the storage medium that are provided in the foregoing embodiments of this disclosure, the visual information of the surrounding environment of the vehicle is collected by using sensors around the vehicle. Boundary data of free space on two sides of the vehicle is determined based on the visual information, so that whether there are vehicles running side by side on the two sides of the vehicle is determined based on the boundary data of free space. Moreover, the lane change information indicating whether lane changing can be performed is determined based on a determining result, so as to control the driving status of the vehicle. Based on a free space, the vehicle running side by side is determined accurately and effectively, providing accurate and reliable lane change information for lane changing. In this way, reliability and safety of an automatic lane change function of the vehicle are improved, thereby resolving a problem in existing technologies that a large vehicle running side by side cannot be effectively recognized based on target detection.

The technical solutions of this disclosure are further described below in detail with reference to the accompanying drawings and the embodiments.

BRIEF DESCRIPTION OF THE DRAWINGS

By describing embodiments of this disclosure more detailed with reference to accompanying drawings, the foregoing and other objectives, features, and advantages of this disclosure will become more apparent. The accompanying drawings are used to provide further understanding of the embodiments of this disclosure, constitute a part of the specification, are used to explain this disclosure together with the embodiments of this disclosure, and do not constitute limitation to this disclosure. In the accompanying drawings, same reference numerals generally represent same components or steps.

FIG. 1 shows an application scenario of a method for controlling lane change according to an exemplary embodiment of this disclosure;

FIG. 2 is a schematic flowchart of a method for controlling lane change according to an exemplary embodiment of this disclosure;

FIG. 4 is a schematic flowchart of step 203 according to an exemplary embodiment of this disclosure;

FIG. 5 is an overall flow block diagram of a method for controlling lane change according to an exemplary embodiment of this disclosure;

DETAILED DESCRIPTION OF THE EMBODIMENTS

Figure 3:
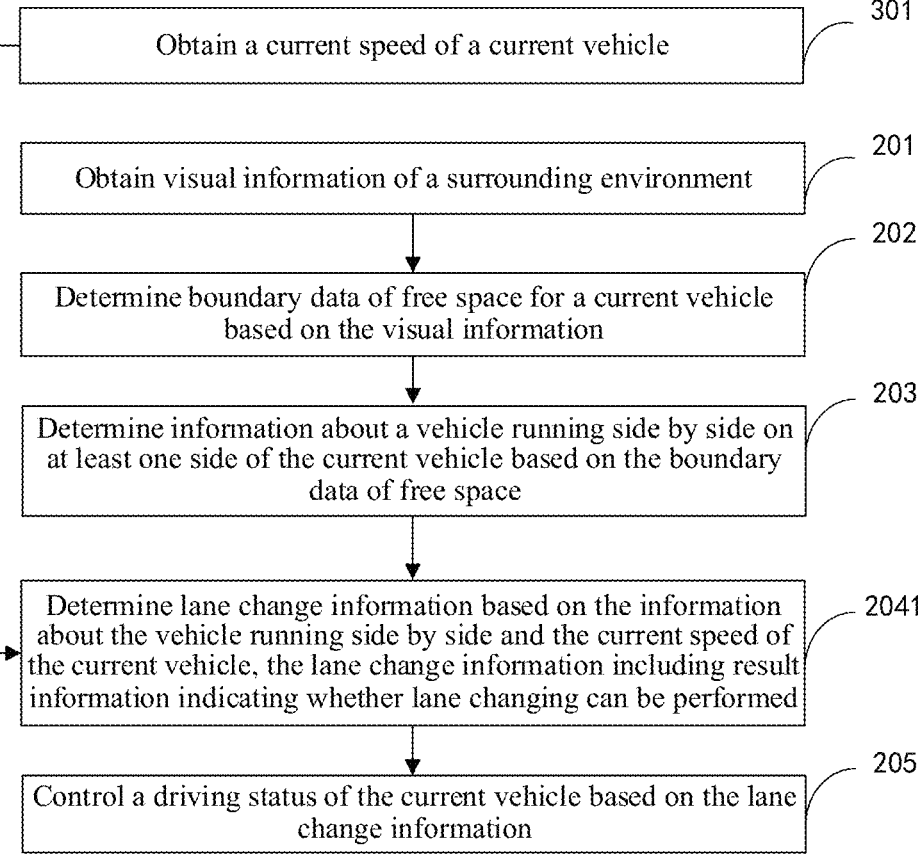
FIG. 3 is a schematic flowchart of a method for controlling lane change according to another exemplary embodiment of this disclosure.

Exemplary embodiments of this disclosure are described below in detail with reference to accompanying drawings. Obviously, the described embodiments are merely a part, rather than all of embodiments of this disclosure. It should be understood that this disclosure is not limited by the exemplary embodiments described herein.

It should be noted that unless otherwise specified, the scope of this disclosure is not limited by relative arrangement, numeric expressions, and numerical values of components and steps described in these embodiments.

A person skilled in the art may understand that terms such as "first" and "second" in the embodiments of this disclosure are merely configured to distinguish between different steps, devices, or modules, and indicate neither any particular technical meaning, nor necessarily logical ordering among them.

It should be further understood that, in the embodiments of this disclosure, the term "multiple"/"a plurality of" may refer to two or more; and the term "at least one" may refer to one, two, or more.

It should be further understood that, any component, data, or structure involved in the embodiments of this disclosure may be generally construed to one or more, unless clearly stated or the context indicates otherwise.

In addition, the term "and/or" in this disclosure refers to only an association relationship that describes associated objects, indicating presence of three relationships. For example, A and/or B may indicate presence of three cases: A alone, both A and B, and B alone. In addition, the character "/" in this disclosure generally indicates an "or" relationship of associated objects.

It should be further understood that, the descriptions of the various embodiments of this disclosure focus on differences among the various embodiments. The same or similar parts among the embodiments may refer to one another. For concision, description is not repeated.

Meanwhile, it should be understood that, for ease of description, the accompanying drawings are not necessarily to scale in size of any of parts shown therein.

Descriptions of at least one exemplary embodiment below are actually illustrative only, and never serve as any limitation to this disclosure along with application or use thereof.

Technologies, methods, and devices known by a person of ordinary skills in the art may not be discussed in detail herein. However, where appropriate, the technologies, the methods, and the devices shall be regarded as a part of the specification.

It should be noted that, similar signs and letters in the following accompanying drawings indicate similar items. Therefore, once a certain item is defined in one of the accompanying drawings, there is no need to further discuss the item in the subsequent accompanying drawings.

The embodiments of this disclosure may be applicable to a terminal device, a computer system, a server, and other electronic devices, which may be operated together with numerous other general-purpose or special-purpose computing system environments or configurations. Well-known examples of a terminal device, a computing system, and environment and/or configuration applicable to be used with the terminal device, the computer system, the server, and other electronic devices include but are not limited to: a personal computer system, a server computer system, a thin client, a thick client, a handheld or laptop device, a microprocessor-based system, a set-top box, programmable consumer electronics, a network personal computer, a small computer system, a mainframe computer system, and a distributed cloud computing technology environment including any of the foregoing systems.

The electronic device such as a terminal device, a computer system, or a server may be described in general context of computer system-executable instructions (such as a program module) executed by the computer system. Generally, the program module may include a routine, a program, a target program, a component, logic, a data structure, and the like that execute particular tasks or implement particular abstract data types. The computer system/server may be implemented in a distributed cloud computing environment. In the distributed cloud computing environment, a task is performed by a remote processing device linked through a communications network. In the distributed cloud computing environment, the program module may be located on a storage medium of a local or remote computing system including a storage device.

Overview of this Disclosure

In a process of implementing this disclosure, the inventor finds that when a self-driving vehicle needs to change lanes during driving, whether there is a vehicle running side by side in an adjacent lane is recognized through target detection. If there is no vehicle running side by side, lane changing may be automatically controlled. However, when there is a large vehicle running side by side, due to a long body and a high chassis of the large vehicle, recognition of the large vehicle running side by side may be missed. In this case, changing lanes is very dangerous. In view of the above, reliability and security of an automatic lane change function in existing technologies are relatively poor.

Exemplary Overview

FIG. 1 shows an application scenario of a method for controlling lane change according to an exemplary embodiment of this disclosure.

As shown in FIG. 1, to ensure safety of lane changing for a case in which vehicles run side by side, according to technical solutions provided in this disclosure, visual information of environments on two sides may be collected by using side-view cameras of a vehicle. The side-view cameras may include a left front camera, a left rear camera, a right front camera, and a right rear camera. The left front camera is mounted on left front of the vehicle, and is configured to collect visual information of a current environment from a left-rear visual angle. The left rear camera is mounted on left rear of the vehicle, and is configured to collect visual information of the current environment from a left-front visual angle. The right front camera is mounted on right front of the vehicle, and is configured to collect visual information of the current environment from a right-rear visual angle. The right rear camera is mounted on right rear of the vehicle, and is configured to collect visual information of the current environment from a right-front visual angle. Boundary data of free space on two sides of the vehicle is determined based on the visual information collected by the various cameras. The boundary data of free space includes a plurality of coordinate points on a free-space boundary. Various coordinate points may be coordinate points in a vehicle coordinate system, which may be established according to actual requirements. In the embodiments of this disclosure, the vehicle coordinate system takes a center of a rear axle of the vehicle as a coordinate origin, takes a length direction of the vehicle as a longitudinal axis (which is represented by using x), and takes a width direction of the vehicle as a lateral axis (which is represented by using y). Whether there are vehicles running side by side in lanes on two sides of the vehicle is determined based on the boundary data of free space on the two sides of the vehicle, so that a more accurate basis is provided for lane change control of the vehicle, so as to avoid missing recognition of a large vehicle running side by side, thereby improving reliability and safety of an automatic lane change function.

Exemplary Method

FIG. 2 is a schematic flowchart of a method for controlling lane change according to an exemplary embodiment of this disclosure. This embodiment may be applicable to an electronic device, such as an in-car computing platform. As shown in FIG. 2, the method includes the following steps.

Step 201: Obtain visual information of a surrounding environment.

The surrounding environment may refer to a left-side environment and a right-side environment of a current vehicle. The visual information may include image information captured by cameras, and may also include information collected by other relevant sensors, such as point cloud data collected by a laser radar. This may be specifically set according to actual requirements. Taking the cameras as an example, a left front camera, a left rear camera, a right front camera, and a right rear camera may be mounted on the vehicle. Visual information from a left-rear visual angle, a left-front visual angle, a right-rear visual angle, and a right-front visual angle is collected by using these cameras.

Step 202: Determine boundary data of free space for a current vehicle based on the visual information.

The boundary data of free space includes a plurality of coordinate points on a boundary of a free space for the current vehicle. A free-space boundary refers to a boundary between a drivable-road area of the current vehicle and an obstacle.

The boundary data of free space may be determined in any implementable manner. The manner for determining the boundary data of free space varies depending on different visual information. For example, if the visual information is image data, an obstacle area and a road area in an image may be recognized based on multi-object detection, so that the boundary data of free space may be obtained based on the obstacle area and the road area. If the visual information includes the image data and point cloud data, the boundary data of free space may be determined based on three-dimensional obstacle information and road information that are recognized based on the point cloud data, in combination with the obstacle area and the road area that are recognized based on the image data. Details are not described.

The boundary data of free space may only include boundary data of free space on a left side, or may only include boundary data of free space on a right side, or may include both the boundary data of free space on the left side and the right side. This may be specifically set according to actual requirements. The boundary data of free space on one side may be determined based on visual information on this side.

For example, the visual information collected by the left front camera and the left real camera is merged to serve as visual information on the left side; and the visual information collected by the right front camera and the right rear camera is merged to serve as visual information on the right side. In this way, the boundary data of free space on the left side is determined based on the visual information on the left side, and the boundary data of free space on the right side is determined based on the visual information on the right side.

Step 203: Determine information about a vehicle running side by side on at least one side of the current vehicle based on the boundary data of free space.

Information about a vehicle running side by side on one side of the current vehicle includes a determining result about whether there is a vehicle running side by side on this side. Because the boundary data of free space is a coordinate point at an intersection of a free space and an obstacle, as long as there are points in the boundary data of free space within a certain range on one side of the current vehicle, it indicates that there is an obstacle within that range. In other words, it is considered that there is a vehicle running side by side on this side.

In practical application, whether there is a vehicle running side by side on which side of the current vehicle may be determined according to actual requirements. For example, only the left side is determined, only the right side is determined, or both the left side and the right side are determined simultaneously. This is not limited in this embodiment. For one side, the information about the vehicle running side by side on this side is determined based on the boundary data of free space on this side.

Step 204. Determine lane change information based on the information about the vehicle running side by side.

The lane change information includes result information indicating whether lane changing can be performed. Corresponding to the foregoing steps, the lane change information may include left-side lane change information and/or right-side lane change information, that is, whether lane changing can be performed on the left side and whether lane changing can be performed on the right side. For one side, if it is determined that there is a vehicles running side by side on this side, lane changing cannot be performed on this side; and if there is no vehicles running side by side on this side, lane changing can be performed on this side. The lane change information provides a basis for a lane change control decision of the current vehicle.

Step 205: Control a driving status of the current vehicle based on the lane change information.

Specifically, if the determined lane change information is that lane changing cannot be performed, the current vehicle is controlled to continue running along a current lane. If the determined lane change information is that lane changing can be performed on the left side or on the right side, the current vehicle may be controlled to change lanes on the left side or the right side. If the determined lane change information is that lane changing can be performed on both the left side and the right side, lane changing can be performed on both the left side and the right side according to actual requirements. A specific control principle of the driving status of the vehicle is an existing technology, and details are not described herein.

According to the method for controlling lane change provided in this embodiment, the boundary data of free space around the current vehicle is determined based on the collected visual information of the surrounding environment of the current vehicle. Whether there are vehicles running side by side on at least one side of the current vehicle is determined based on the boundary data of free space, so as to determine whether lane changing can be currently performed based on a situation of the vehicles running side by side. In this way, a more accurate and reliable basis is provided for the lane change control decision of the vehicle, so as to avoid potential safety hazards to a lane change caused by missing recognition of a large vehicle running side by side, thereby improving reliability and safety of an automatic lane change function of the vehicle.

In an optional example, FIG. 3 is a schematic flowchart of a method for controlling lane change according to another exemplary embodiment of this disclosure. In this example, the information about the vehicle running side by side on at least one side of the current vehicle includes result information indicating whether there is a vehicle running side by side on at least one side of the current vehicle. As shown in FIG. 3, before determining the lane change information based on the information about the vehicle running side by side, the method in this disclosure further includes:

Step 301: Obtain a current speed of the current vehicle.

The current speed of the current vehicle may be obtained by using a speed sensor, or may be obtained in any other implementable manners. This may be specifically set according to actual requirements, and is not limited in this embodiment.

Correspondingly, step 204 of determining the lane change information based on the information about the vehicle running side by side specifically includes:

Step 2041: Determine the lane change information based on the information about the vehicle running side by side and the current speed of the current vehicle, the lane change information including result information indicating whether lane changing can be performed.

To ensure driving safety of the vehicle, lateral movements of the vehicle may be limited by the current speed of the vehicle. When the speed of the vehicle is too fast, it is not suitable for lane changing. Different paths are taken for lane changing when the speed of the vehicle is at different levels. Therefore, in this disclosure, the lane change information is determined in combination with the determined information about the vehicle running side by side and the current speed of the current vehicle, so as to further improve reliability and safety of automatic lane changing.

For example, for one side, if there is no vehicle running side by side on this side, but the current speed of the current vehicle is greater than a preset speed threshold, it is determined that lane changing cannot be performed on this side.

In an optional example, when it is determined that lane changing can be performed, the lane change control decision may also be made based on the current speed of the vehicle, so as to determine a specific path for lane changing. Different paths for lane changing may be set for different speeds of the vehicle, which may be specifically set according to actual requirements.

In an optional example, to perform lane changing, whether the current speed of the current vehicle is less than the preset speed threshold may also be determined first. If the current speed is less than the preset speed threshold, whether there is a vehicle running side by side is determined. If the current speed is greater than or equal to the preset speed threshold, it may be directly determined that lane changing cannot be performed, without determining a situation of the vehicle running side by side.

In this disclosure, whether lane changing can be performed is determined in combination with the current speed of the vehicle and a situation of vehicles driving side by side on two sides of the vehicle, thereby further improving the reliability and safety of the automatic lane change function.

FIG. 4 is a schematic flowchart of step 203 according to an exemplary embodiment of this disclosure.

In an optional example, as shown in FIG. 4, the boundary data of free space includes coordinate points in a vehicle coordinate system. Correspondingly, step 203 may specifically include the following steps.

Step 2031: Determine distances from coordinate points in the boundary data of free space to a center line of the vehicle, respectively.

Step 2032: Determine that there is no vehicle running side by side on a first side if distances from all coordinate points in first boundary data of free space corresponding to the first side in the at least one side of the current vehicle to the center line of the vehicle are greater than a preset threshold.

The preset threshold may be set based on a lane width and a lateral safe distance for lane changing of the vehicle, for example, may be set to 10 meters or another value. The center line of the vehicle is a line where a longitudinal axis of the vehicle coordinate system is located. When the distances from all the coordinate points in the boundary data of free space (using the boundary data of free space on the left side as an example) to the center line of the vehicle are greater than the preset threshold, it indicates that there is no obstacle within a range of 10 meters to the left side of the current vehicle. Therefore, there is no vehicle running side by side.

In an optional example, step 203 further includes the following steps.

Step 2033: if in the first boundary data of free space corresponding to the first side in the at least one side of the current vehicle, there are coordinate points whose distances to the center line of the vehicle are less than or equal to the preset threshold, the first boundary data of free space is filtered according to a preset filtering rule, to obtain second boundary data of free space.

The first side may be the left side, and correspondingly, the first boundary data of free space may be the boundary data of free space on the left side. The first side may also be the right side, and correspondingly, the first boundary data of free space is the boundary data of free space on the right side. The preset filtering rule may be set according to actual requirements, to filter out invalid data. The invalid data may be, for example, coordinate points with distances greater than the preset threshold to the center line of the vehicle, consecutive lateral coordinate points, and other noise points. If in the first boundary data of free space, there are coordinate points whose distances to the center line of the vehicle are less than the preset threshold, it indicates that there is an obstacle within a range with a distance of the preset threshold to the first side of the current vehicle, which may bring in safety hazards to lane changing of the current vehicle. Therefore, whether lane changing can be performed needs to be further confirmed.

Step 2034: Classify the second boundary data of free space based on a support vector machine algorithm, to obtain a classification result.

The classification result includes a type to which the second boundary data of free space belongs. For example, there are two types: 1 and −1. 1 is used to indicate that there is no vehicle running side by side, and −1 is used to indicate that there is a vehicle running side by side.

The support vector machine (SVM for short) algorithm is a kind of generalized linear classifier that performs binary classification on data through supervised learning, and a decision boundary thereof is a maximum margin hyperplane solved for learning samples, which can effectively resolve classification issues. A SVM projects a feature parameter into a high-dimensional space, and then searches for the hyperplanes to partition the data. An objective of the SVM is to maximize an interval width under a premise of correct classification, to convert the classification issues into optimization issues.

A specific process of the support vector machine algorithm includes: training to obtain a classification model based on training sample data and a preset loss function. The classification model includes a classification hyperplane and a classification decision function that are obtained through training, so that to-be-classified objects (the second boundary data of free space in this disclosure) are classified based on the classification decision function. A classification process based on the classification decision function includes: performing a kernel inner product operation on the coordinate points in the second boundary data of free space based on a kernel function, multiplying them with a pre-obtained coefficient after the inner product operation and summing them up, and then classifying summation results based on a signal function. The preset loss function may be any implementable loss function, which may be specifically set according to actual requirements. According to actual requirements, a kernel function may be selected as a linear kernel function $$\left(K(X_i, X_j) = X_i^T X_j\right),$$

a polynomial kernel function $$\left(K(X_i, X_j) = \left(\gamma X_i^T X_j + r\right)^d\right),$$

or a Gaussian function $(\exp(-\gamma(X_i - X_j)^2)$, which is not specifically limited. $X_i, X_j$ respectively represent elements in an input vector, corresponding to two coordinate points in the boundary data of free space in this disclosure. $\gamma$, r, d are relevant parameters, which may be set according to actual requirements or may be obtained through learning. A specific principle of the support vector machine algorithm is an existing technology, and details are not described herein. During a training process, the training sample data may include positive sample data, negative sample data, and corresponding label data. The positive sample data is boundary data of free space when there is no vehicle running side by side, and the negative sample data is boundary data of free space when there is a vehicle running side by side. Model parameters are constantly adjusted based on the preset loss function, to ultimately obtain a trained classification model. A specific training process is not described.

In practical application, the support vector machine algorithm may be a basic algorithm of a support vector machine or any implementable improved algorithm, which is not limited in this embodiment.

Step 2035: Determine whether there is a vehicle running side by side on the first side based on the classification result.

Specifically, whether there is a vehicle running side by side on the first side may be determined based on a type flag of the classification result and a corresponding relationship between the type flag and a meaning. For example, if the type flag is 1, it is determined that there is no vehicle running side by side. If the type flag is −1, it indicates there is a vehicle running side by side. The specific type flag may be set according to actual requirements, and is not limited in this disclosure.

In this disclosure, a case in which whether there is a vehicle running side by side cannot be determined based on a distance from the center line is further determined based on the support vector machine algorithm, to determine whether there is a vehicle running side by side. In this way, the reliability and security of the automatic lane change function may be further improved.

In an optional example, for a case in which it is needed to determine whether there are vehicles running side by side on the left side and the right side of the current vehicle, two classification models based on an SVM algorithm may be used to determine situations on the left side and the right side respectively, so as to improve a data processing speed. The two models comprehensively output two-dimensional vectors including a left-side classification result and a right-side classification result, such as (L, R)=(1, −1), or (L, R)=(1, 0), where 1 indicates that there is no vehicle running side by side, and −1, and 0 indicate that there is a vehicle running side by side. Specific representation is not limited.

In an optional example, before classifying the second boundary data of free space based on the support vector machine algorithm, to obtain the classification result, the method in this disclosure further includes: normalizing the second boundary data of free space to obtain third boundary data of free space; and correspondingly, classifying the second boundary data of free space based on the support vector machine algorithm, to obtain the classification result includes: classifying the third boundary data of free space based on the support vector machine algorithm, to obtain a classification result.

Specifically, issues about determining whether there is a vehicle running side by side depends heavily on a horizontal coordinate (a y-coordinate) of the boundary data of free space, while does not require much consideration for an ordinate. However, the ordinate is required during classification based on the support vector machine algorithm. To reduce impact of the ordinate on the classification result, in this disclosure, the second boundary data of free space is normalized, so as to normalize a ordinate of the coordinate point in the second boundary data of free space, thereby reducing an overall range of the coordinate point while keeping a horizontal coordinate unchanged. For example, all ordinates are normalized to a range of ( ) 1, or to a range smaller than an original range. A specific degree of normalization may be set according to actual requirements, and is not limited in this embodiment. Correspondingly, during the classification, the third boundary data of free space obtained after the normalization is classified.

It may be understood that when training a support vector machine classification model, correspondingly; the training sample data also needs to be normalized.

In this disclosure, the second boundary data of free space is normalized and the ordinate of the coordinate point thereof is normalized to a smaller range, so that impact of the ordinate on the classification result of the SVM algorithm may be effectively reduced, thereby further improving classification accuracy.

In an optional example, step 203 of determining the information about the vehicle running side by side on at least one side of the current vehicle based on the boundary data of free space may specifically include: determining the information about the vehicle running side by side on at least one side of the current vehicle based on K consecutive frames of boundary data of free space, where K is an integer greater than 1.

K may be set according to actual requirements, for example, may be set as K=2 or K=3. A setting principle is to ensure validity of accumulated data, that is, time cannot be too long. When the time is too long, impact on subsequent control decisions may be reduced. As a result, a determining result may not be real-time enough. To further improve accuracy of determining a situation of vehicles running side by side, in this disclosure, the situation of vehicles running side by side is determined based on multiple consecutive frames of boundary data of free space. Specifically, for a case of one side, K frames of boundary data of free space on this side may be merged to serve as boundary data of free space for determining a situation of vehicles running side by side on this side. Further, the information about the vehicle running side by side on this side is determined according to the processing process in the foregoing embodiments or examples based on the merged boundary data of free space.

In this disclosure, the information about the vehicle running side by side on at least one side of the current vehicle is determined based on K consecutive frames of boundary data of free space, thereby avoiding a situation where reliability of a single frame of data is low; and further improving the reliability and security of the automatic lane change function.

In an optional example, step 204 of determining the lane change information based on the information about the vehicle running side by side includes: determining the lane change information based on the information about the vehicle running side by side that is consecutively determined M times, where M is an integer greater than 1.

A value of M may be set according to actual requirements, and a setting principle is similar to that for K. When the information about the vehicle running side by side that is determined once is obtained, counting is performed and the information about the vehicle running side by side at this time is stored. After the information about the vehicle running side by side is consecutively obtained M times, M results are integrated to determine whether lane changing can be performed.

For example, taking determining on both the left side and the right side as an example, information about the vehicle running side by side (L, R) is obtained M=3 times, which respectively are (1, 0), (1, 0), and (1, 0). L represents the left side. R represents the right side, 1 indicates that there is no vehicle running side by side (which may also be considered as indicating that a determining result at this time is that lane changing can be performed), and 0) indicates that there is a vehicle running side by side (which indicates that the determining result at this time is that lane changing cannot be performed). A final decision of whether lane changing can be performed is made by integrating the three results. A specific determining rule may be set according to actual requirements. For example, for one side, when there is a preset proportion of results in M results that indicate that there is no vehicle running side by side, it may be determined that lane change information on this side is that lane changing can be performed. For another example, to further ensure safety of lane changing, it is determined that lane changing can be performed only when the M results all indicate that there is no vehicle running side by side. Otherwise, lane changing cannot be performed. In this case, among the three results, the information about the vehicle running side by side on the left side is 1 for three times, and therefore, lane changing can be performed on the left side; and the information about the vehicle running side by side on the right side is 0 for three times, and therefore, lane changing cannot be performed on the left side. Final lane change information includes that lane changing can be performed on the left side and lane changing cannot be performed on the right side.

In this disclosure, the lane change information is determined based on the information about the vehicle running side by side that is consecutively determined M times, so that reliability of the lane change information is further improved, thereby improving the reliability and security of the automatic lane change function.

In an optional example, in the information about the vehicle running side by side that is consecutively determined M times, the information about the vehicle running side by side that is determined at any time may be determined based on one frame of boundary data of free space, or may be determined based on K consecutive frames of boundary data of free space, which may be specifically set according to actual requirements.

For example, for a first time, based on three accumulated consecutive frames of boundary data of free space, the information about the vehicle running side by side on the left side and the right side of the current vehicle is determined, which serves as information about the vehicle running side by side that is determined once. Subsequently, for a second time, 3 frames of boundary data of free space are accumulated, and then the information about the vehicle running side by side on the left side and the right side of the current vehicle is determined. In this case, information about the vehicle running side by side that is determined twice. Others may be deduced by analogy. Information about the vehicle running side by side that is determined M times (such as three times) consecutively is accumulated, and is comprehensively used for determining the final lane changing information.

In an optional example, FIG. 5 is an overall flow block diagram of a method for controlling lane change according to an exemplary embodiment of this disclosure. In this example, as shown in FIG. 5, taking the left side as an example, if the right side is similar, the two sides are determined concurrently. The method for controlling lane change specifically includes:

1. Obtain visual information of a surrounding environment.

2. Determine boundary data of free space on a left side of a current vehicle based on the visual information.

3. Determine whether there are points within a range of 10 meters. Step 4 is proceeded to if there are points, and step 11 is proceeded to if there are no points.

In other words, whether there are points in the boundary data of free space within a range of a lateral distance of 10 meters from a center line of the vehicle is determined.

4. Remove points outside the range of 10 meter from the boundary data of free space on the left side, to obtain second boundary data of free space.

5. Normalize the second boundary data of free space to obtain third boundary data of free space.

6. Accumulate K frames of three boundary data of free space to obtain fourth boundary data of free space.

7. Classify the fourth boundary data of free space based on a support vector machine algorithm, to obtain a classification result.

8. Determine whether there is a vehicle running side by side on the left side based on the classification result, and obtain information about the vehicle running side by side.

9. Determine final lane change information on the left side based on the information about the vehicle running side by side that is consecutively determined M times.

10. Control a driving status of the current vehicle based on the lane change information.

11. If it is determined that the lane change information is that lane changing can be performed on the left side, proceed to step 10.

Any method for controlling lane change provided in the embodiments of this disclosure may be implemented by any suitable device with a data processing capability, including but not limited to a terminal device and a server. Alternatively, any method for controlling lane change provided in the embodiments of this disclosure may be implemented by a processor. For example, the processor implements any method for controlling lane change in the embodiments of this disclosure by invoking corresponding instructions stored in a memory. Details are not described below again.

Exemplary Apparatus

Figure 6:
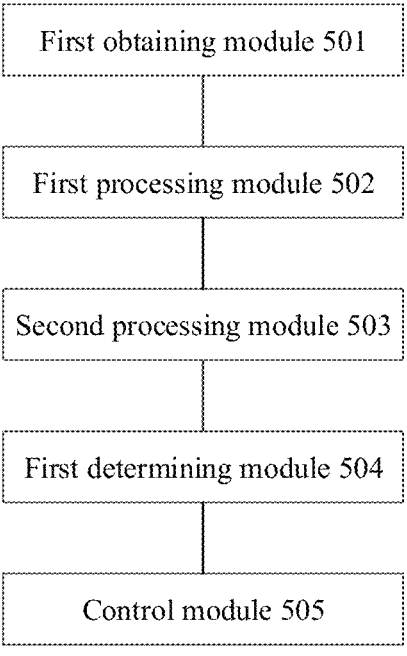
FIG. 6 is a schematic diagram of a structure of an apparatus for controlling lane change according to an exemplary embodiment of this disclosure.

FIG. 6 is a schematic diagram of a structure of an apparatus for controlling lane change according to an exemplary embodiment of this disclosure. The apparatus in this embodiment may be configured to implement the corresponding method embodiments of this disclosure. The apparatus shown in FIG. 6 includes a first obtaining module 501, a first processing module 502, a second processing module 503, a first determining module 504, and a control module 505.

The first obtaining module 501 is configured to obtain visual information of a surrounding environment.

The first processing module 502 is configured to determine boundary data of free space for a current vehicle based on the visual information obtained by the first obtaining module 501.

The second processing module 503 is configured to determine information about a vehicle running side by side on at least one side of the current vehicle based on the boundary data of free space determined by the first processing module 502.

The first determining module 504 is configured to determine lane change information based on the information about the vehicle running side by side that is determined by the second processing module 503.

The control module 505 is configured to control a driving status of the current vehicle based on the lane change information determined by the first determining module 504.

Figure 7:
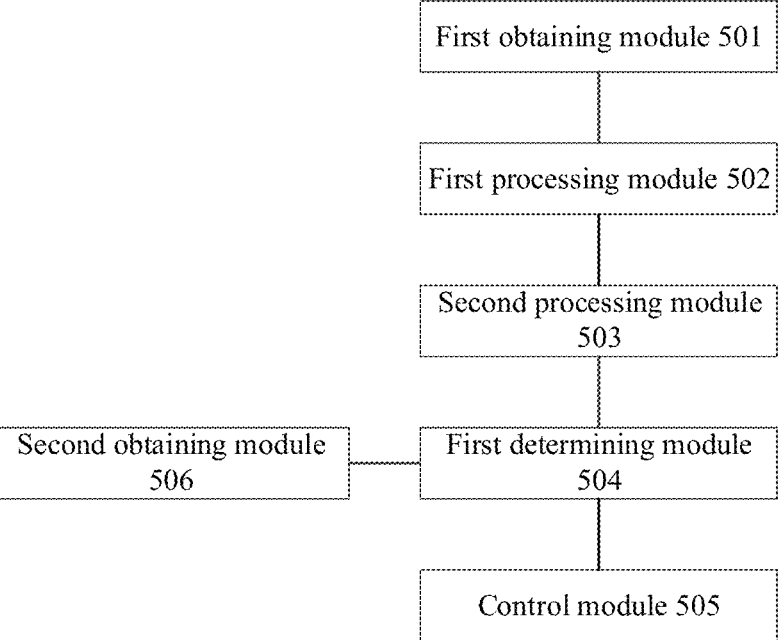
FIG. 7 is a schematic diagram of a structure of an apparatus for controlling lane change according to another exemplary embodiment of this disclosure.

FIG. 7 is a schematic diagram of a structure of an apparatus for controlling lane change according to another exemplary embodiment of this disclosure.

In an optional example, the information about the vehicle running side by side on at least one side of the current vehicle includes result information indicating whether there is a vehicle running side by side on at least one side of the current vehicle. Correspondingly, as shown in FIG. 7, the apparatus in this disclosure further includes a second obtaining module 506. The second obtaining module 506 is configured to obtain a current speed of the current vehicle. Correspondingly, the first determining module 504 is specifically configured to determine the lane change information based on the information about the vehicle running side by side that is determined by the second processing module 503 and the current speed obtained by the second obtaining module 506. The lane change information includes result information indicating whether lane changing can be performed.

Figure 8:
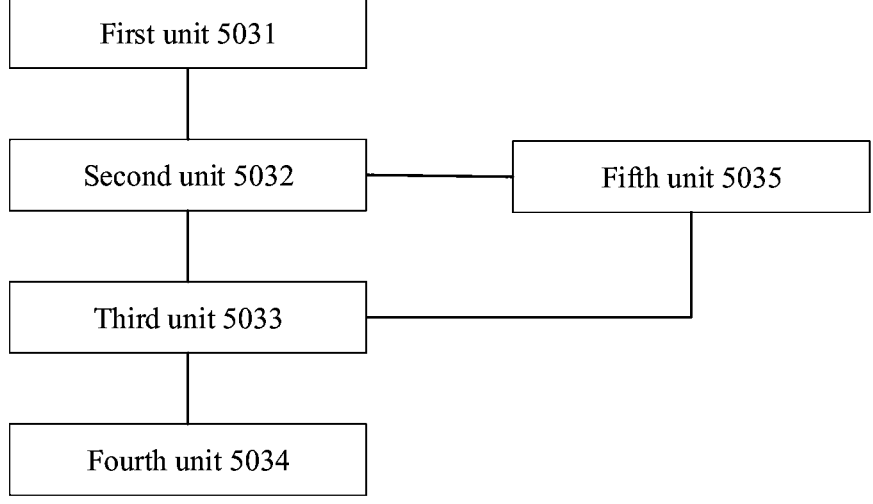
FIG. 8 is a schematic diagram of a structure of a second processing module according to an exemplary embodiment of this disclosure.

FIG. 8 is a schematic diagram of a structure of a second processing module according to an exemplary embodiment of this disclosure.

In an optional example, the boundary data of free space includes coordinate points in a vehicle coordinate system. As shown in FIG. 8, the second processing module 503 includes a first unit 5031 that is configured to determine that there is no vehicle running side by side on a first side if distances from all coordinate points in first boundary data of free space corresponding to the first side in the at least one side to a center line of the vehicle are greater than a preset threshold.

In an optional example, the second processing module 503 further includes a second unit 5032, a third unit 5033, and a fourth unit 5034. The second unit 5032 is configured to filter the first boundary data of free space according to a preset filtering rule, to obtain second boundary data of free space, if in the first boundary data of free space, there are coordinate points whose distances from the center line of the vehicle are less than or equal to the preset threshold. The third unit 5033 is configured to classify, based on a support vector machine algorithm, the second boundary data of free space obtained by the second unit 5032, to obtain a classification result. The fourth unit 5034 is configured to determine whether there is a vehicle running side by side on the first side based on the classification result obtained by the third unit 5033.

In an optional example, the second processing module 503 further includes a fifth unit 5035 that is configured to normalize the second boundary data of free space obtained by the second unit 5032 to obtain third boundary data of free space. Correspondingly, the third unit 5033 is specifically configured to classify, based on the support vector machine algorithm, the third boundary data of free space obtained by the fifth unit 5035, to obtain a classification result.

In an optional example, the second processing module 503 is specifically configured to determine the information about the vehicle running side by side on at least one side of the current vehicle based on K consecutive frames of boundary data of free space, where K is an integer greater than 1.

In an optional example, the first determining module 504 is specifically configured to determine the lane change information based on the information about the vehicle running side by side that is consecutively determined M times, where M is an integer greater than 1.

Exemplary Electronic Device

An embodiment of this disclosure further provides an electronic device, including: a memory; configured to store a computer program; and a processor, configured to execute the computer program stored in the memory. When the computer program is executed, the method for controlling lane change according to any one of the foregoing embodiments of this disclosure is implemented.

Figure 9:
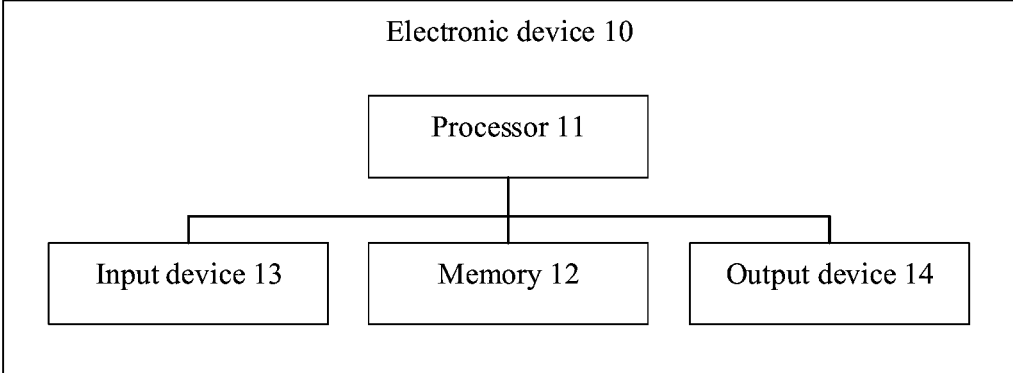
FIG. 9 is a schematic diagram of a structure of an electronic device according to an exemplary embodiment of this disclosure.

FIG. 9 is a schematic diagram of a structure of an electronic device according to an exemplary embodiment of this disclosure. In this embodiment, as shown in FIG. 9, an electronic device 10 includes one or more processors 11 and a memory 12.

The processor 11 may be a central processing unit (CPU) or another form of processing unit having a data processing capability and/or instruction execution capability, and may control another component in the electronic device 10 to perform a desired function.

The memory 12 may include one or more computer program products. The computer program product may include various forms of computer readable storage media, such as a volatile memory and/or a non-volatile memory. The volatile memory may include, for example, a random access memory (RAM) and/or a cache. The nonvolatile memory may include, for example, a read-only memory (ROM), a hard disk, and a flash memory. One or more computer program instructions may be stored on the computer readable storage medium. The processor 11 may execute the program instructions to implement the method for controlling lane change according to various embodiments of this disclosure that are described above and/or other desired functions. Various contents such as an input signal, a signal component, and a noise component may also be stored in the computer readable storage medium.

In an example, the electronic device 10 may further include an input device 13 and an output device 14. These components are connected to each other through a bus system and/or another form of connection mechanism (not shown).

For example, the input device 13 may be a microphone or a microphone array, which is configured to capture an input signal of a sound source.

In addition, the input device 13 may further include, for example, a keyboard and a mouse.

The output device 14 may output various information to the outside, including determined distance information, direction information, and the like. The output device 14 may include, for example, a display, a speaker, a printer, a communication network, and a remote output device connected by the communication network.

Certainly, for simplicity, FIG. 9 shows only some of components in the electronic device 10 that are related to this disclosure, and components such as a bus and an input/output interface are omitted. In addition, according to specific application situations, the electronic device 10 may further include any other appropriate components.

Exemplary Computer Program Product and Computer Readable Storage Medium

In addition to the foregoing method and device, the embodiments of this disclosure may also relate to a computer program product, which includes computer program instructions. When the computer program instructions are run by a processor, the processor is enabled to perform the steps, of the method for controlling lane change according to the embodiments of this disclosure, that are described in the "exemplary method" part of this specification.

The computer program product may be program code, written with one or any combination of a plurality of programming languages, that is configured to perform the operations in the embodiments of this disclosure. The programming languages include an object-oriented programming language such as Java or C++, and further include a conventional procedural programming language such as a "C" language or a similar programming language. The program code may be entirely or partially executed on a user computing device, executed as an independent software package, partially executed on the user computing device and partially executed on a remote computing device, or entirely executed on the remote computing device or a server.

In addition, the embodiments of this disclosure may further relate to a computer readable storage medium, which stores computer program instructions. When the computer program instructions are run by the processor, the processor is enabled to perform the steps, of the method for controlling lane change according to the embodiments of this disclosure, that are described in the "exemplary method" part of this specification.

The computer readable storage medium may be one readable medium or any combination of a plurality of readable media. The readable medium may be a readable signal medium or a readable storage medium. The readable storage medium may include, for example, but is not limited to electricity, magnetism, light, electromagnetism, infrared ray, or a semiconductor system, an apparatus, or a device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above.

Basic principles of this disclosure are described above in combination with specific embodiments. However, it should be pointed out that the advantages, superiorities, and effects mentioned in this disclosure are merely examples but are not for limitation, and it cannot be considered that these advantages, superiorities, and effects are necessary for each embodiment of this disclosure. In addition, specific details described above are merely for examples and for ease of understanding, rather than limitations. The details described above do not limit that this disclosure must be implemented by using the foregoing specific details.

The various embodiments in this specification are all described in a progressive way, and each embodiment focuses on a difference from other embodiments. For same or similar parts among the various embodiments, reference may be made to each other. The system embodiments basically correspond to the method embodiments, and thus are relatively simply described. For related parts, reference may be made to a part of the descriptions of the method embodiments.

The block diagrams of the equipment, the apparatus, the device, and the system involved in this disclosure are merely exemplary examples and are not intended to require or imply that the equipment, the apparatus, the device, and the system must be connected, arranged, and configured in the manners shown in the block diagrams. It is recognized by a person skilled in the art that, the equipment, the apparatus, the device, and the system may be connected, arranged, and configured in an arbitrary manner. The terms such as "include", "contain", and "have" are open terms that mean "including but not limited to", and can be used interchangeably with "including but not limited to". The terms "or" and "and" used herein refer to the term "and/or", and can be used interchangeably with "and/or", unless the context clearly indicates otherwise. The term "such as" used herein refers to the phrase "such as but not limited to", and can be used interchangeably with "such as but not limited to".

The method and the apparatus in this disclosure may be implemented in many manners. For example, the method and the apparatus in this disclosure may be implemented by software, hardware, firmware, or any combination of the software, the hardware, and the firmware. The foregoing sequence of the steps of the method is for illustration only, and the steps of the method in this disclosure are not limited to the sequence specifically described above, unless otherwise specifically stated in any other manners. In addition, in some embodiments, this disclosure may also be implemented as programs recorded in a recording medium. These programs include machine-readable instructions for implementing the method for controlling lane change according to this disclosure. Therefore, this disclosure further relates to a recording medium storing a program for implementing the method for controlling lane change according to this disclosure.

It should be further pointed out that, various components or various steps in the apparatus, the device, and the method of this disclosure may be disassembled and/or recombined. These disassembling and/or recombinations shall be regarded as equivalent solutions of this disclosure.

The foregoing description about the disclosed aspects is provided, so that this disclosure can be arrived at or carried out by any person skilled in the art. Various modifications to these aspects are very obvious to a person skilled in the art. Moreover, general principles defined herein may be applicable to other aspects without departing from the scope of this disclosure. Therefore, this disclosure is not intended to be limited to the aspects illustrated herein, but to the widest scope consistent with the principles and novel features disclosed herein.

The foregoing descriptions are given for illustration and description. In addition, the description is not intended to limit the embodiments of this disclosure to forms disclosed herein. Although a plurality of exemplary aspects and embodiments have been discussed above, a person skilled in the art may recognize certain variations, modifications, changes, additions, and sub-combinations thereof.

What is claimed is:

1. A method for controlling lane change, comprising:
  obtaining visual information of a surrounding environment;
  determining boundary data of free space for a current vehicle based on the visual information, wherein the boundary data of free space includes a plurality of coordinate points on a boundary of free space for the current vehicle, wherein the boundary of free space refers to a boundary between a drivable-road area of the current vehicle and an obstacle;
  determining information about a vehicle running side by side on at least one side of the current vehicle based on the boundary data of free space, wherein the information about the vehicle running side by side on the at least one side of the current vehicle is determined based on a relationship between distances from the coordinate points to a center line of the current vehicle and a preset threshold;
  determining lane change information based on the information about the vehicle running side by side; and
  controlling a driving status of the current vehicle based on the lane change information.

2. The method according to claim 1, wherein the information about the vehicle running side by side on at least one side of the current vehicle comprises result information indicating whether there is a vehicle running side by side on at least one side of the current vehicle; and before the determining lane change information based on the information about the vehicle running side by side, the method further comprises:
  obtaining a current speed of the current vehicle; and
  the determining lane change information based on the information about the vehicle running side by side comprises:
  determining the lane change information based on the information about the vehicle running side by side and the current speed of the current vehicle, the lane change information comprising result information indicating whether lane changing can be performed.

3. The method according to claim 2, wherein the boundary data of free space comprises coordinate points in a vehicle coordinate system; and the determining information about a vehicle running side by side on at least one side of the current vehicle based on the boundary data of free space comprises:
  determining that there is no vehicle running side by side on a first side if distances from all coordinate points in first boundary data of free space corresponding to the first side in the at least one side to the center line of the current vehicle are greater than the preset threshold.

4. The method according to claim 3, wherein the determining information about a vehicle running side by side on at least one side of the current vehicle based on the boundary data of free space further comprises:
  if in the first boundary data of free space, there are coordinate points whose distances to the center line of the current vehicle are less than or equal to the preset threshold, filtering the first boundary data of free space according to a preset filtering rule to obtain second boundary data of free space;
  classifying the second boundary data of free space based on a support vector machine algorithm, to obtain a classification result; and
  determining whether there is a vehicle running side by side on the first side based on the classification result.

5. The method according to claim 4, wherein before the classifying the second boundary data of free space based on a support vector machine algorithm, to obtain a classification result, the method further comprises:
  normalizing the second boundary data of free space to obtain third boundary data of free space; and
  the classifying the second boundary data of free space based on a support vector machine algorithm, to obtain a classification result comprises:
  classifying the third boundary data of free space based on the support vector machine algorithm, to obtain a classification result.

6. The method according to claim 5, wherein the determining lane change information based on the information about the vehicle running side by side comprises:

determining the lane change information based on the information about the vehicle running side by side that is consecutively determined M times, wherein M is an integer greater than 1.

7. The method according to claim 4, wherein the determining lane change information based on the information about the vehicle running side by side comprises:

determining the lane change information based on the information about the vehicle running side by side that is consecutively determined M times, wherein M is an integer greater than 1.

8. The method according to claim 3, wherein the determining lane change information based on the information about the vehicle running side by side comprises:

determining the lane change information based on the information about the vehicle running side by side that is consecutively determined M times, wherein M is an integer greater than 1.

9. The method according to claim 2, wherein the determining lane change information based on the information about the vehicle running side by side comprises:

determining the lane change information based on the information about the vehicle running side by side that is consecutively determined M times, wherein M is an integer greater than 1.

10. The method according to claim 1, wherein the determining information about a vehicle running side by side on at least one side of the current vehicle based on the boundary data of free space comprises:

determining the information about the vehicle running side by side on at least one side of the current vehicle based on K consecutive frames of boundary data of free space, wherein K is an integer greater than 1.

11. The method according to claim 10, wherein the determining lane change information based on the information about the vehicle running side by side comprises:

determining the lane change information based on the information about the vehicle running side by side that is consecutively determined M times, wherein M is an integer greater than 1.

12. The method according to claim 1, wherein the determining lane change information based on the information about the vehicle running side by side comprises:

determining the lane change information based on the information about the vehicle running side by side that is consecutively determined M times, wherein M is an integer greater than 1.

13. A non-transitory computer readable storage medium, wherein the storage medium stores a computer program, and the computer program is used for implementing a method for controlling lane change, wherein the method for controlling lane change comprises:

obtaining visual information of a surrounding environment;

determining boundary data of free space for a current vehicle based on the visual information, wherein the boundary data of free space includes a plurality of coordinate points on a boundary of free space for the current vehicle, wherein the boundary of free space refers to a boundary between a drivable-road area of the current vehicle and an obstacle;

determining information about a vehicle running side by side on at least one side of the current vehicle based on the boundary data of free space, wherein the information about the vehicle running side by side on the at least one side of the current vehicle is determined based on a relationship between distances from the coordinate points to a center line of the current vehicle and a preset threshold;

determining lane change information based on the information about the vehicle running side by side; and controlling a driving status of the current vehicle based on the lane change information.

14. The non-transitory computer readable storage medium according to claim 13, wherein the information about the vehicle running side by side on at least one side of the current vehicle comprises result information indicating whether there is a vehicle running side by side on at least one side of the current vehicle; and before the determining lane change information based on the information about the vehicle running side by side, the method further comprises:

obtaining a current speed of the current vehicle; and the determining lane change information based on the information about the vehicle running side by side comprises:

determining the lane change information based on the information about the vehicle running side by side and the current speed of the current vehicle, the lane change information comprising result information indicating whether lane changing can be performed.

15. The non-transitory computer readable storage medium according to claim 14, wherein the boundary data of free space comprises coordinate points in a vehicle coordinate system; and the determining information about a vehicle running side by side on at least one side of the current vehicle based on the boundary data of free space comprises:

determining that there is no vehicle running side by side on a first side if distances from all coordinate points in first boundary data of free space corresponding to the first side in the at least one side to the center line of the current vehicle are greater than the preset threshold.

16. The non-transitory computer readable storage medium according to claim 15, wherein the determining information about a vehicle running side by side on at least one side of the current vehicle based on the boundary data of free space further comprises:

if in the first boundary data of free space, there are coordinate points whose distances to the center line of the current vehicle are less than or equal to the preset threshold, filtering the first boundary data of free space according to a preset filtering rule to obtain second boundary data of free space;

classifying the second boundary data of free space based on a support vector machine algorithm, to obtain a classification result; and determining whether there is a vehicle running side by side on the first side based on the classification result.

17. An electronic device, wherein the electronic device comprises:

a processor; and a memory, configured to store processor executable instructions, wherein the processor is configured to read the executable instructions from the memory, and execute the instructions to implement a method for controlling lane change, wherein the method for controlling lane change comprises:

obtaining visual information of a surrounding environment;

determining boundary data of free space for a current vehicle based on the visual information, wherein the boundary data of free space includes a plurality of coordinate points on a boundary of free space for the current vehicle, wherein the boundary of free space refers to a boundary between a drivable-road area of the current vehicle and an obstacle;

determining information about a vehicle running side by side on at least one side of the current vehicle based on the boundary data of free space, wherein the information about the vehicle running side by side on the at least one side of the current vehicle is determined based on a relationship between distances from the coordinate points to a center line of the current vehicle and a preset threshold;

determining lane change information based on the information about the vehicle running side by side; and controlling a driving status of the current vehicle based on the lane change information.

18. The electronic device according to claim 17, wherein the information about the vehicle running side by side on at least one side of the current vehicle comprises result information indicating whether there is a vehicle running side by side on at least one side of the current vehicle; and before the determining lane change information based on the information about the vehicle running side by side, the method further comprises:

obtaining a current speed of the current vehicle; and the determining lane change information based on the information about the vehicle running side by side comprises:

determining the lane change information based on the information about the vehicle running side by side and the current speed of the current vehicle, the lane change information comprising result information indicating whether lane changing can be performed.

19. The electronic device according to claim 18, wherein the boundary data of free space comprises coordinate points in a vehicle coordinate system; and the determining information about a vehicle running side by side on at least one side of the current vehicle based on the boundary data of free space comprises:

determining that there is no vehicle running side by side on a first side if distances from all coordinate points in first boundary data of free space corresponding to the first side in the at least one side to the center line of the current vehicle are greater than the preset threshold.

20. The electronic device according to claim 19, wherein the determining information about a vehicle running side by side on at least one side of the current vehicle based on the boundary data of free space further comprises:

if in the first boundary data of free space, there are coordinate points whose distances to the center line of the current vehicle are less than or equal to the preset threshold, filtering the first boundary data of free space according to a preset filtering rule to obtain second boundary data of free space;

classifying the second boundary data of free space based on a support vector machine algorithm, to obtain a classification result; and determining whether there is a vehicle running side by side on the first side based on the classification result.

* * * * *